US007706534B2

(12) United States Patent
Saarikivi (10) Patent No.: US 7,706,534 B2
(45) Date of Patent: Apr. 27, 2010

(54) PAY PER MINUTE FOR DVB-H SERVICES

(75) Inventor: Tuomo Saarikivi, Helsinki (FI)

(73) Assignee: Nokia Corporation, Espoo (FI)

( * ) Notice: Subject to any disclaimer, the term of this patent is extended or adjusted under 35 U.S.C. 154(b) by 1074 days.

(21) Appl. No.: 11/363,534

(22) Filed: Feb. 28, 2006

(65) Prior Publication Data

US 2007/0201695 A1    Aug. 30, 2007

(51) Int. Cl.
   *H04N 7/167*  (2006.01)
(52) U.S. Cl. ........................... 380/233; 380/239
(58) Field of Classification Search ............ 380/42, 380/231, 30, 239, 201, 233; 709/203; 713/170, 713/171, 178, 194, 25, 31, 168; 725/114, 725/25, 31, 103
   See application file for complete search history.

(56) References Cited

U.S. PATENT DOCUMENTS

| 6,363,149 | B1 * | 3/2002 | Candelore ................ 380/45 |
| 6,735,313 | B1 * | 5/2004 | Bleichenbacher et al. ... 380/241 |
| 6,857,132 | B1 * | 2/2005 | Rakib et al. .............. 725/114 |
| 2003/0217163 | A1 * | 11/2003 | Lagerweij et al. ......... 709/229 |
| 2004/0032950 | A1 * | 2/2004 | Graunke ................... 380/42 |
| 2007/0201695 | A1 * | 8/2007 | Saarikivi ................. 380/231 |
| 2008/0219436 | A1 * | 9/2008 | Chen et al. ................ 380/30 |
| 2009/0067621 | A9 * | 3/2009 | Wajs ...................... 380/42 |

FOREIGN PATENT DOCUMENTS

EP    1292144 A1 *  3/2003
EP    1327929 A1 *  7/2003

OTHER PUBLICATIONS

DVB Digital Video Broadcasting, IP Datacast over DVB-H: Service Purchase and Protection (SPP), DVB Document A100, Dec. 2005.
Yondong Wu, HweeHwa Pang and Robert H. Deng, "How Much You Watch, How Much You Pay", Visual Communications and Image Processing, Jul. 12-15, 2005, Beijing, China, vol. 5960, No. 2, pp. 961-968, ISSN 0277-786X.
PCT International Search Report, International Application No. PCT/IB2007/000379, mailed Oct. 15, 2007, 5 pages.
International Preliminary Report on Patentability for International Application No. PCT/IB2007/000379, issued Sep. 2, 2008, 6 pages.

* cited by examiner

*Primary Examiner*—Gilberto Barron, Jr.
*Assistant Examiner*—Soheila Davanlou
(74) *Attorney, Agent, or Firm*—Ditthavong Mori & Steiner, P.C.

(57) ABSTRACT

Provided are apparatuses, methods, and user interfaces for requesting access to a program or service, receiving the requested program or service and displaying the requested program or service at a user terminal. In one example, a request for a period of time for access to the program or service is transmitted from a user terminal via a broadcast network. The period of time may be converted to a key decryption count corresponding to the period of time and key interval, the key interval being a period of time separating adjacent key stream messages in a key stream corresponding to a content data stream for the program or service. The encrypted program or service may be decrypted at the user terminal based on the period of access, key interval, and/or key decryption count.

29 Claims, 8 Drawing Sheets

PAY PER MINUTE FOR DVB-H SERVICES

FIELD OF THE INVENTION

The invention relates generally to communications networks. More specifically, the invention relates to providing access to programming in a communication network.

BACKGROUND OF THE INVENTION

Digital broadband broadcast networks enable end users to receive digital content including video, audio, data, and so forth. Using a mobile terminal, a user may receive digital content over a wireless digital communications network. For example, a user may receive data such as a broadcast program in a data stream. However, certain data transmissions may be intended for selected end users and not other end users. In this case, a method should be employed to prevent unauthorized access of the data transmission by end users not entitled to receive the data transmission.

Typically, transmitted data is encrypted to prevent unauthorized access to the data. For example, an algorithm may be employed to encrypt the data such that the encrypted data is unreadable. The data may be decrypted at an authorized terminal with the use of a key such as a particular number or string of characters. For the unidirectional communication of data in a digital communications network, a user terminal may receive a signal and filter encrypted services and decrypt the encrypted services with keys that are delivered through the digital communications network. In addition, the keys used to decrypt the data may be encrypted such that a user would need access to both the key for encrypting the data (i.e., a transport encryption key) and the key for encrypting the transport encryption key.

A user terminal may have access to a transmitted program or service for an authorized period of time such as, for example, when a user pays for access to the program or service. In this case, the user gains access to a program or service for a particular length of time, for example, the length of time of the program or service. As an example, a user may wish to view a television program that is one hour long. In this case, the user may purchase access to view the television program during that one hour period which the television program is broadcast.

However, access to the program or service for the user is limited in many ways. For example, the access to the program is time-based such that the keys for decrypting the program or for decrypting transport encryption keys are based on a length of time corresponding to the program. Such a key management system is inefficient since the user is purchasing the keys that provide access to the program or service content and may thus be unable to purchase access to a desired program/service or portion of a program/service.

Thus, a system and method is needed for providing access to a program or service such as programming via a digital communications network in an efficient and flexible manner. Also, a system and method is needed for permitting an end user to gain access to desired portions of a program or service.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method, device, and computer-readable medium is provided for receiving an encrypted program or service at a terminal, transmitting a purchase request including a requested period of access to the program or service, receiving a key stream containing a plurality of key stream messages (KSM) wherein each KSM is separated in time from a neighboring KSM by a key interval, and decrypting each KSM received in the key stream for a granted period of access wherein the granted period of access is based on the count of decryption operations and therefore dependent on the key interval.

In another example, a method for providing an encrypted program or service to a terminal is provided. In one example, the method includes receiving a purchase request including a requested period of access to the program or service, converting the period of access to a corresponding number of KSM decryption counts, transmitting the number of counts within a rights object message, and transmitting the encrypted program or service and a corresponding key stream containing a plurality of key stream messages (KSM) separated by a key interval where the number of counts is based on the key interval.

In another example, a display device is described having rendered thereon a query specification comprising a first field name in association with a first input field, the first input field for receiving a first user input comprising an identifier corresponding to a requested program or service and a second field name in association with a second input field, the second input field for receiving a requested period of time for access to the requested program or service. In another example, a third field name is provided for receiving a request for start time to begin access to a decrypted program or service.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
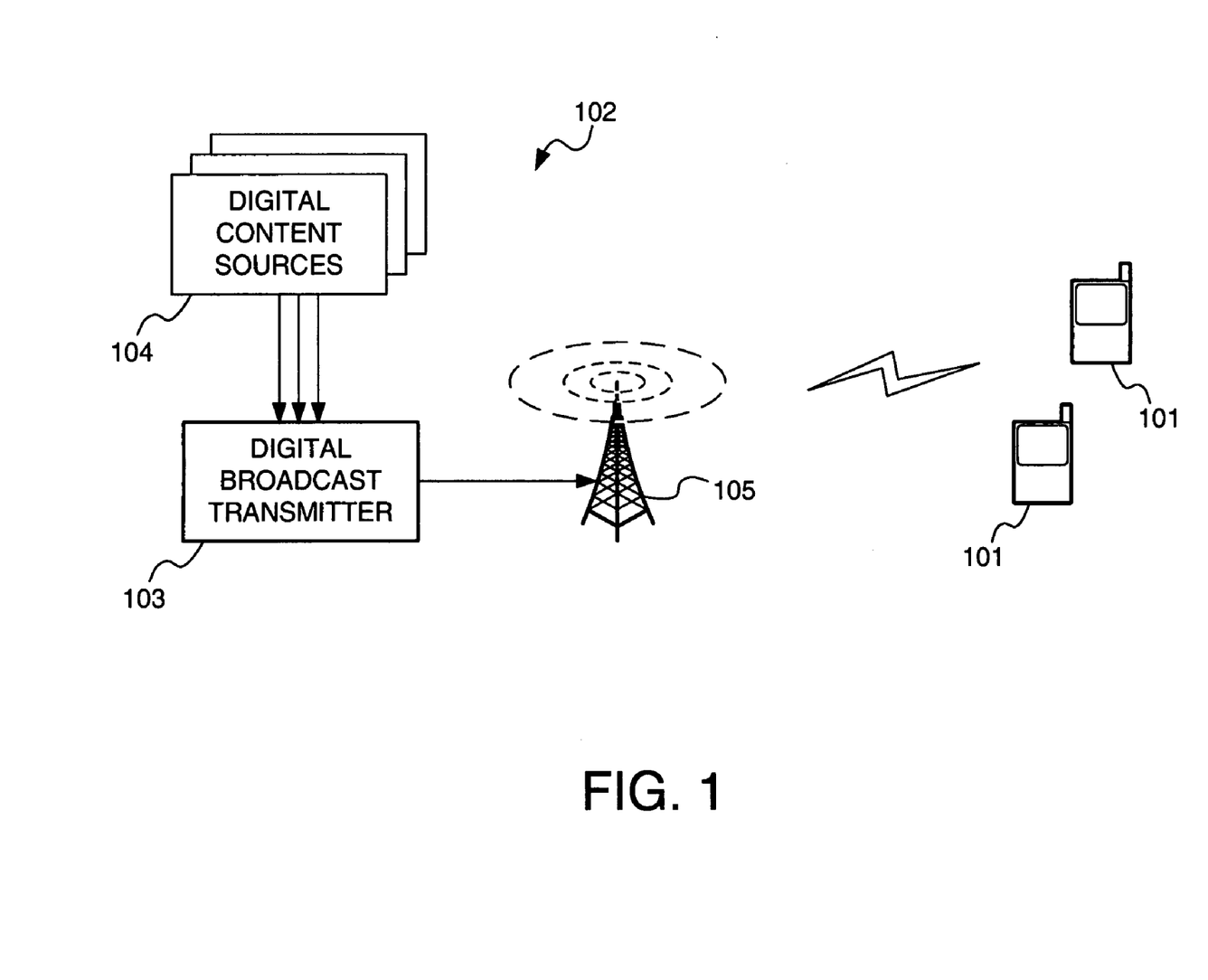
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments of the invention may be implemented. Systems such as the one illustrated here may utilize a digital broadband broadcast technology, for example Digital Video Broadcast—Handheld (DVB-H). Examples of other digital broadcast standards which digital broadband broadcast system 102 may utilize include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Forward Link Only (FLO), Digital Audio Broadcasting (DAB), and Digital Radio Mondiale (DRM). Other digital broadcasting standards and techniques, now known or later developed, may also be used. An aspect of the invention is also applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals 101 may selectively receive and consume digital content originating from digital content sources 104.

In an example of the DVB standard, one DVB 10 Mbit/s transmission may have 200, 50 kbit/s audio program channels or 50, 200 kbit/s video (TV) program channels. A mobile device may be configured to receive, decode, and process transmissions based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device may have one or more buffer memories for storing the decoded time sliced transmission before presentation.

Rights to access data may be controlled via a rights management system. For example, when files are stored in a device, certain users may have authorization to access the stored files while other users may not have authorization to access the stored files. Similarly, receiving data content via a digital communications network may be limited to certain end users and restricted from other end users. In one example, a user may purchase access to a program by paying a fee for the program. If the user pays the fee, the user may be granted access to the program for the specified period of time while a user who has not paid the fee may not have access to the program.

Access to the program may be regulated by encryption of the transmitted data. For example, the data may be encrypted by any number of encryption standards through use of an encryption key. At the receiver or user terminal, a key may be used to decrypt the encrypted data so that the content may be viewable at the receiver or user terminal. The key for decrypting the encrypted data may also be delivered via the same digital communications network and may also be encrypted. For the delivery of one or more keys also other digital communications networks can be used. Thus, an end user wishing to access or view the program or service may need to obtain the rights to the keys.

In another example, a two tier system of encryption and data security is provided in which the data is encrypted with a transport encryption key and the transport encryption key is also encrypted. The key that encrypts the transport encryption key may change periodically, for example, daily, weekly, monthly, bimonthly, etc. In another example, the transport encryption key may change at a high frequency which may or may not relate to a length of a particular program or service being provided.

In one example, transport encryption keys associated with an encrypted program or service may be transmitted in a key stream to a user terminal. The key stream may include key stream messages (KSM) that are transmitted at a predetermined frequency. When an encrypted data stream is received at a receiver or user terminal, the key stream messages (KSM) may also be received. Any KSM received may also be decrypted.

Figure 2:
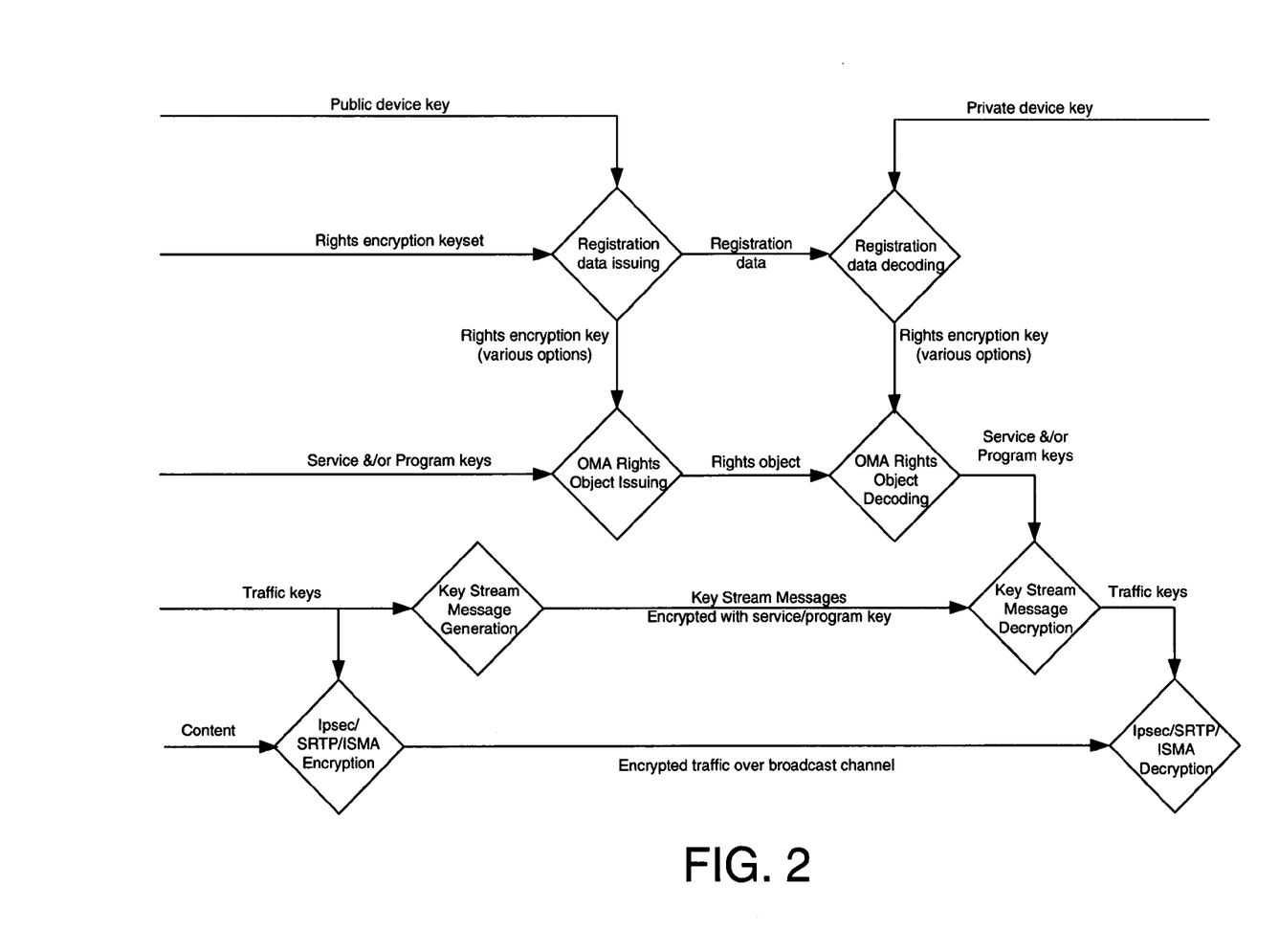
FIG. 2 illustrates an example of a service protection solution based on a four-layer cryptographic architecture in which one or more illustrative embodiments of the invention may be implemented.

FIG. 2 illustrates an example of a service protection solution based on a four-layer cryptographic architecture to provide secure subscription and pay-per-view purchase options for a service. In one example, program or service encryption may be performed using 128 bit symmetric traffic keys.

In the example illustrated in FIG. 2, traffic keys may be applied as part of standard IP Security (IPsec) security associations (SAs), or as a Secure Real-time Transport Protocol (SRTP) master key, from which the session key may be derived. These may be used by the IPsec or SRTP layers to perform decryption automatically before passing the packets to the receiving application.

The traffic keys may not be protected by IPsec. For example, the traffic keys may be encrypted with a service or program key on the key stream layer above the IP socket interface. These broadcast messages carrying traffic keys may be referred to as key stream messages. Key stream messages can contain multiple levels of encryption. For example, key stream messages may contain two levels of encryption. Separate program and service keys may have different lifetimes and can be used to provide for a single service with different granularities of purchase periods to different users. This allows for the efficient implementation of both subscription and pay-per-view business models for the same service. Pay-per-view customers may be provided with a program key which is only valid for a single program while subscribers are given a service key, valid for reception of the service for some longer period. Within the key stream message, the traffic key may be encrypted with a program key, and the program key may also be carried and/or encrypted with the service key. Thus, in this example, pay-per-view subscribers can directly decrypt the traffic key, while subscribers can decrypt the program key using the service key, which can then be used to decrypt the traffic key.

Key stream messages may contain extensions to content IDs, which are carried in the ESG, for the program and/or service. Devices can use this ID to identify which Rights Object contains the keys to use for key stream message decryption. Where the two-level service and program functionality is not required, the traffic key can be directly encrypted with either the service or program key and the service-key-encrypted program key omitted.

The service or program key(s) may be transmitted to each receiving device, for example within OMA DRM (Open Mobile Alliance Digital Rights Management) 2.0 rights objects (ROs). Such transmission of ROs can be done in at least two different ways, depending on whether the receiving device can make use of a separate interactivity channel: via a broadcast channel, or by using the separate interactivity channel. In both cases the ROs can be utilized by the customer device only, since the service or program key sections may be protected for example according to the OMA DRM 2.0 standard or, in the broadcast case, by a variant of OMA DRM 2.0.

Bandwidth may be considered when delivering Rights Objects over the broadcast channel. For example, a bandwidth constraint may be addressed in at least two complementary ways. First, a new binary form of the OMA DRM 2.0 Rights Object, called a Broadcast Rights Object (BCRO), can be defined. Second, a method for securely delivering BCROs to groups of devices using a single broadcast message can be used. Valuable portions of Rights Objects can be protected by group or unit keys, and when necessary, Zero Message Broadcast encryption can be used to allow messages to be decrypted only by arbitrary sets of devices within a larger group.

As another example, an additional mechanism may include, as in OMA DRM 2.0, for Rights Objects to be issued to a group of devices known as a domain. The domain may contain a number of devices belonging to the same user, and may be used by Rights Issuers to sell subscriptions allowing all devices within the domain to receive protected services.

Registration can be performed either via the interactivity or broadcast channels. In the case that the interactivity channel is used, the registration protocol may be according to OMA DRM 2.0 and unit keys may be delivered, protected with the public key of the device.

As the example illustrates, the program or service key protection thus can be based according to OMA DRM 2.0 on a public key cryptosystem where the public key of the customer device may be registered at each Rights Issuer and the corresponding private key is kept within the customer device. In this embodiment, OMA DRM 2.0 may be used. Alternatively, another DRM system may be used including a corresponding Rights Management Layer and Registration Layer.

Figure 3:
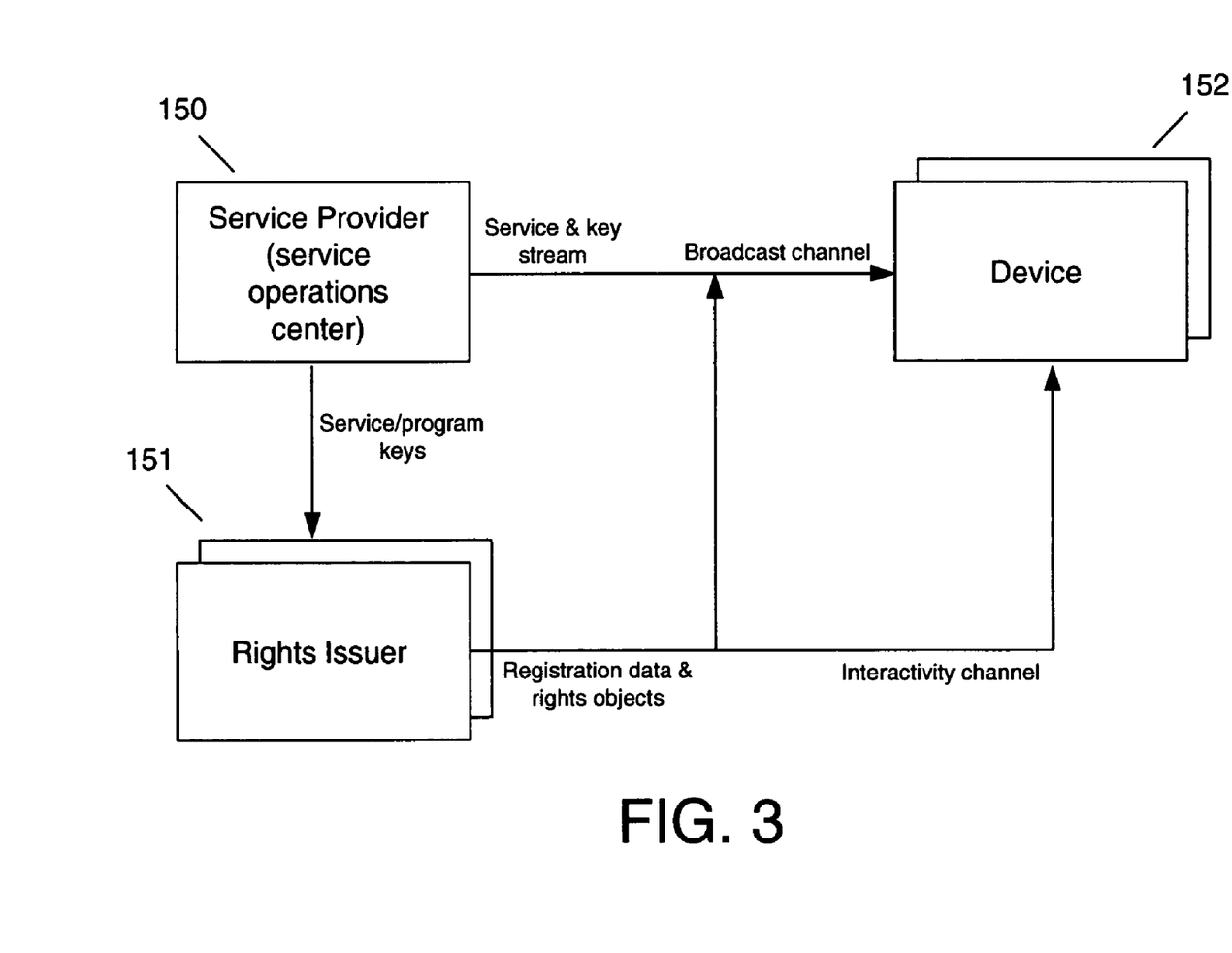
FIG. 3 illustrates an example of an end-to-end system according to an aspect of the present invention.

FIG. 3 illustrates an example of an end-to-end system according to an aspect of the present invention. The system may include a Service Provider 150, also known as the Service Operations Center that may broadcast and encrypt a service and a key stream. The service provider 150 may provide service and program keys to Rights Issuers 151. The Rights Issuer 151 may register devices and provide Rights Objects to those registered devices. Providing Rights Objects to registered devices may allow registered devices to decrypt the services which they are entitled to receive.

The system may also include a device 152 that receives the service and decrypts the service if the device 152 has the corresponding Rights Objects and presents the Rights Objects to the user. Also, an interoperability point between the key stream layer and the rights management layer may allow multiple DRM implementations to be used simultaneously in the described infrastructure. Rights to one and the same service can be sold via multiple Rights Issuers using multiple rights management systems and multiple DRM implementations without needing to broadcast the service or the key stream multiple times. A Rights Issuer in this context does not imply an OMA DRM 2.0 Rights Issuer, it merely indicates an entity issuing Rights Objects independent of the DRM system used.

Figure 4:
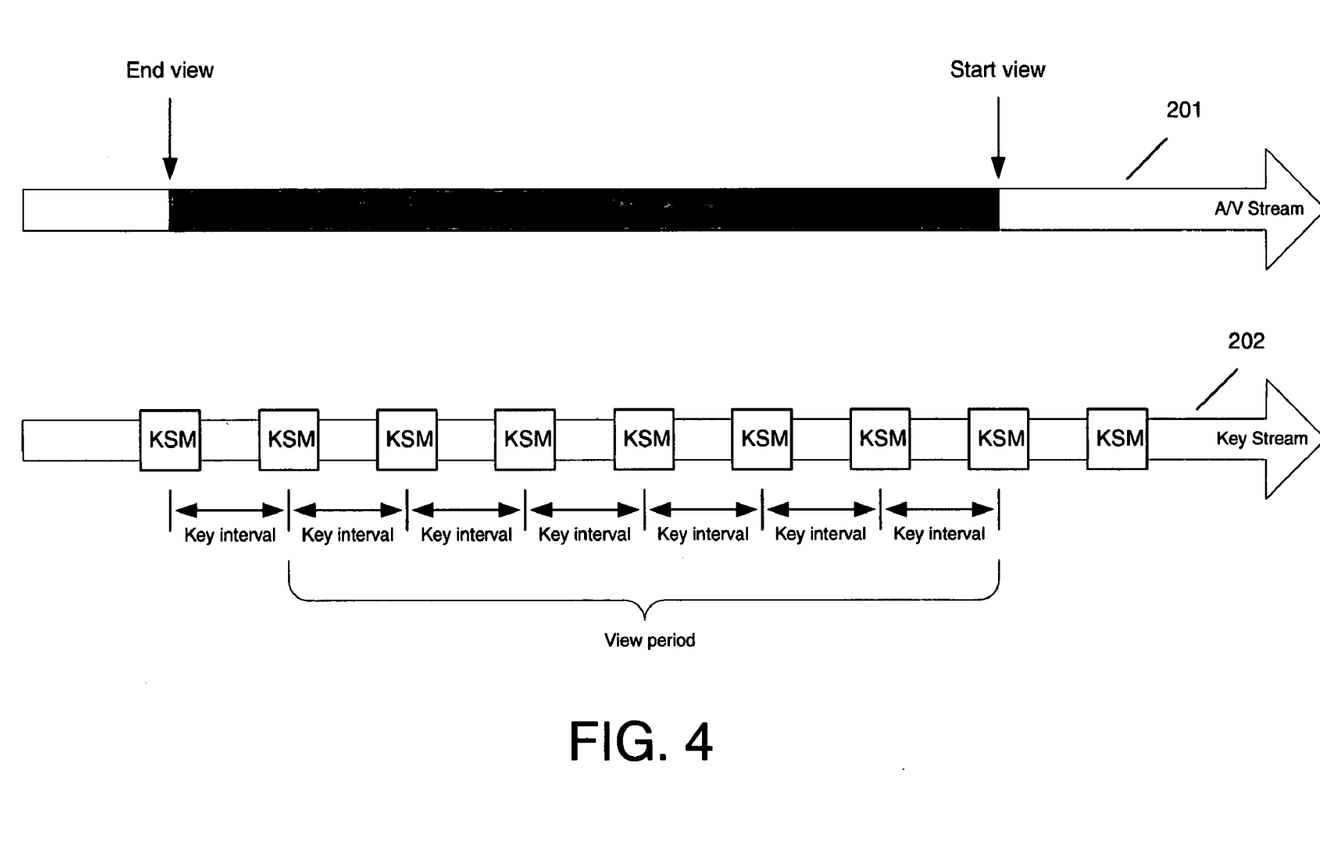
FIG. 4 illustrates an example of a content data stream and corresponding key stream for transmitting key stream messages at a predetermined frequency in accordance with an aspect of the present invention.

FIG. 4 illustrates an example of a key stream for transmitting key stream messages at a predetermined frequency. In this example, a data stream 201 for an encrypted program or service is transmitted to a user terminal. The data stream 201 (e.g., A/V stream as illustrated in FIG. 4) contains data corresponding to the program or service to be received at the user terminal. For example, a television program may be broadcast from a service provider to a user terminal. The television program may be a program which is only accessible or viewable if a user has paid a fee. Thus, the television program may be encrypted so that only those users who have access to the program (e.g., paid the fee) may view the program. If a user has paid the fee, the encrypted television program is received at the user's receiver and may further be decrypted at the user's receiver or terminal.

A key stream 202 corresponding to the program or service data stream may be transmitted via the digital communications network to the user terminal. As FIG. 4 illustrates, a key stream 202 containing key stream messages may be transmitted to the user terminal where the key stream messages are transmitted at a predetermined frequency or key interval. Each KSM is separated in time from a subsequent KSM by the key interval as illustrated in this example. As a KSM is received at a user terminal and if the user has access to the encrypted program or service, the program or service may be decrypted and the program or service content may be viewed or accessed. Thus, as the content of the program or service changes over time as the program or service continues to be broadcast, each KSM received over the time during the broadcast of the program or service that access to the program or service is granted or permitted may be decrypted. Access to the program may be provided via KSM decryption of the corresponding program or service at the receiver or user terminal based on KSM decryption and the time of decryption may be converted to a count of KSMs decrypted rather than a time when it is allowed to decrypt KSMs where the count is based on timing of the KSMs related to program or service.

FIG. 4 further illustrates receiving and decrypting a program or service based on a KSM count. In this example, a program which the user may access begins at the "start view" point in the ANV stream. The start view point corresponds to a KSM received at the user terminal which itself may be decrypted. Decryption of the KSM may result in decryption of the program or service content such that the program or service may be viewed or accessed at the user terminal. After a key interval, a second KSM is received at the user terminal. If the user still has access to the program at the time of receipt of the second KSM, the second KSM may be decrypted at the user terminal and the corresponding program or service may likewise be decrypted. In this way, the program or service may still be accessed or viewed at the user terminal.

Thus, a user may gain access to a program or service via acquiring the rights to the program or service or acquiring rights to a portion of the program or service. If the user acquires rights to the program or service, then corresponding KSMs may be decrypted and the corresponding program or service may be obtained at the terminal. For example, a user may request rights to a program or service for a period of time (e.g., minutes, hours, etc.). The rights may be issued to the user via a digital rights management system (DRM). Also, the right may be provided to the user in counts of KSM decryptions. In this example, the DRM may be receiving the request for rights from a user for a period of time of access. The DRM may then provide the rights to the user for a number of KSM decryption counts corresponding to the length of time requested by the user. KSMs received during the requested time period and corresponding to a number of KSM decryption counts may be decrypted and the corresponding program or service may be received at the terminal. For every KSM that is decrypted, the KSM decryption count for rights may be decreased (e.g., one decrement in the rights for each KSM decryption operation). After the number of remaining counts is depleted, access to the program or service ends. In another embodiment the count for rights can be increased up to a final number corresponding to the requested period.

This process may continue as each subsequent KSM is received for each key interval. If the key interval is designated as "m" and the number of KSM messages during which time the user may have access to the corresponding program or service is designated as "n", then the period of time during which the user may access the program or service may be determined as "k" which may be equal to n*m, or the product of the number of KSM messages of access and the key interval. Further, in another example, a computer-readable medium including computer instructions is provided for transmitting a request for access to a program or service for a specified access period, receiving a key stream and key stream messages (KSM) and decrypting the KSMs and the corresponding program or service.

As an example to illustrate, if the key interval (i.e., "m") is 20 seconds, then each KSM is separated by 20 seconds. A user may wish to receive a particular program or service and may purchase rights to the program or service based on a number of KSM decryption counts. In this way, the viewing time of the program or service may be tailored to the user's needs or desires. In this example, the user may wish to view a program or service for a particular length of time. For example, a user may wish to view a preview of a program or service or a favorite portion of program or service. In this example, the preview may be provided free to the user for a period of time so that the user may determine if the access to the remainder of the program or service is desired. The period of time which the preview of the program or service is provided (i.e., the free period) may be determined based on a number of KSM decryption counts (or "key intervals"). The number of KSM decryption counts may further correspond to a length of time.

As an example, the user may thus purchase the rights to the program or service (or a free portion of a program such as a preview may be provided) based on the number of KSM message decryptions (i.e., "counts"). In this example, the key interval is 20 seconds and the user may purchase rights to the program or service for 180 KSM decryption counts. In this example of purchasing 180 KSM decryption counts of rights to the program or service with a key interval of 20 seconds, the total amount of time of access for the user to the program or service is (180 counts)*(20 seconds)=3600 seconds=1 hour. Thus, if the program or service is one hour long, the user may purchase rights to view or access the program or service for 1 hour by purchasing 180 KSM decryption counts. Likewise, a user may purchase rights to any length of time by varying the number of KSM decryption counts purchased.

Viewing does not have to be continuous, but may happen in pieces. A user may use the KSM decryption counts for example so that if there are 180 decryptions the first 60 of them (corresponding to 20 minutes) are used at one time and later the same channel/service is viewed for another 20 minutes, which consumes another 60 decryption counts. The user would still have 20 minutes or 60 KSM decryption counts of viewing time left for further use. Further in another embodiment the remaining counts may be transferred for decrypting another program or service.

In one example, a DRM system supports count-based access. The DRM system keeps track of the counts and for each KSM decrypted the number of counts is decremented or incremented accordingly by the DRM system. After the number or counts is depleted, access to the program or service ends.

In another example, a user may receive a short preview of a program or service in which a portion of the program (i.e., the preview portion) may be free. For example, a user may receive 30 counts of a program or service for free. In this example in which the key interval is 20 seconds, the total length of time for free preview is (30 counts)*(20 seconds) =600 seconds=10 minutes.

In another example, the user may purchase access rights to a program or service based on a period of time. The user may input a request into a user terminal such as a mobile device to indicate the desired length of access time desired. The request may be transmitted via a specified digital communications network to a network side device which may convert the request from a time period to a value corresponding to a number of counts. The number of KSM decryption counts determined may be based on the key interval as described herein.

Figure 5:
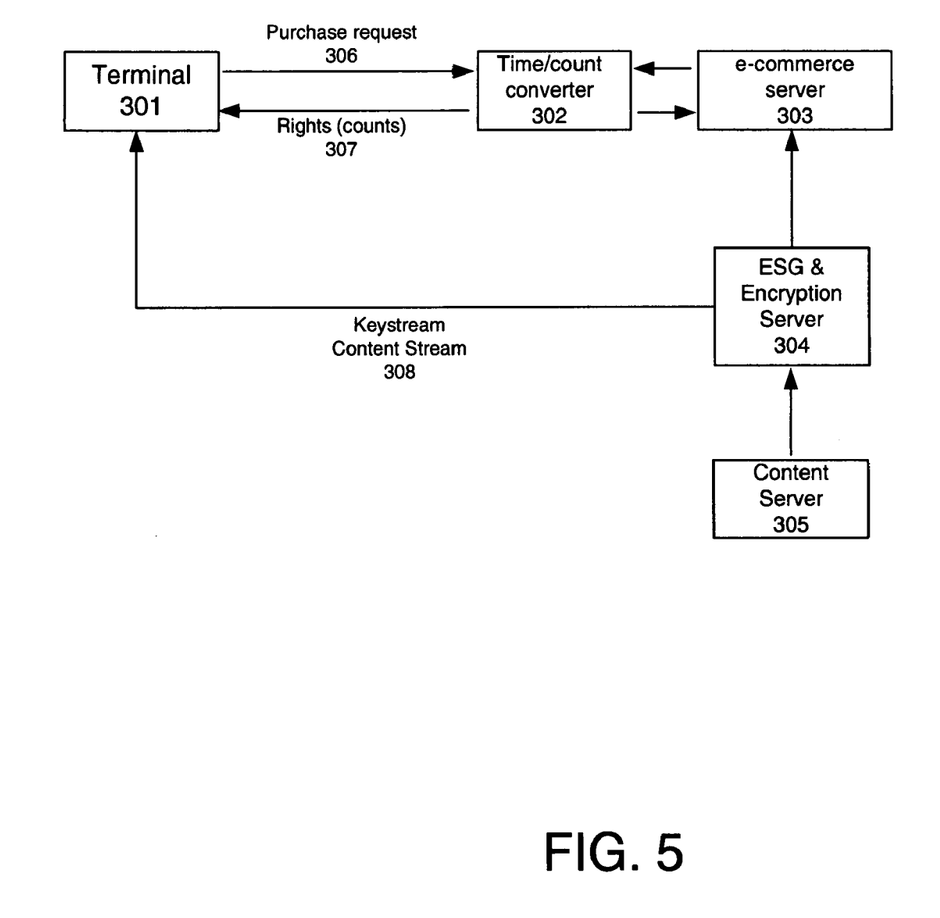
FIG. 5 is a partial block diagram illustrating an example of a system for providing a period of rights of access to a program or service for a user in accordance with an aspect of the present invention.

FIG. 5 is a partial block diagram illustrating an example of a system for providing a period of rights of access to a program or service for a user. In this example, a content server 305 may provide a program or service for transmission in a digital communications network. The program or service may be limited to users or subscribers who have paid for the right of access to the program or service. Thus, the program or service may be encrypted such that those users who do not have right of access (e.g., did not pay a required fee) cannot receive the program or service in a viewable form. In this example, an encryption server 304 may encrypt the program or service such that a terminal receiving the encrypted program or service may view the program or service if the terminal has a key to decrypt the program.

As illustrated in this example, the program or service content may be transmitted to the terminal 301 (path 308). Also, the key stream as described above corresponding to the content stream for the program or service may be transmitted to the terminal 301. Optionally, Electronic Service Guide (ESG) data associated with the program or service may also be transmitted to the terminal 301, as illustrated in FIG. 5.

The user at the terminal 301 may wish to obtain a right of access to the program or service content from the content server 305. In this example, the user may send a purchase request 306 to request access to the program or service. The purchase request 306 may further include a payment of a fee to purchase the right of access. The purchase request 306 may be transmitted to a time/count converter 302 for processing. In this example, the user may indicate in the purchase request 306 a desired period in which access to the program or service is desired. The purchase request 306 containing the desired period may be received at the time/count converter 302 which may convert the period of time requested in the purchase request 306 to a count of KSM decryption operations. The count of KSM decryptions may be based on the key stream or the frequency of the key stream. For example, the time/count converter 302 may convert the period requested to a number of counts with the formula k=n*m in which k is the viewing period requested, n is the number of counts and m is the key interval. Hence, in this example, if a request for a period is received at the time/count converter 302, then the time/count converter 302 may divide the period requested by the key interval to determine the number of KSM decryption counts requested. The value of the number of KSM decryption counts may be transmitted to an e-commerce server 303 which may further process the request and provide rights or KSM decryption counts in response. The rights or KSM decryption counts 307 may be returned to the terminal 301 so that the terminal 301 may decrypt each KSM during the period of time of access based on the rights or KSM decryption counts 307 received.

Rights to a program or service may be defined by a DRM rights object in a DRM system. The DRM rights object may further include the number of counts within a DRM object. The DRM system enforces the count by providing access to a program or service for the requested period of time. The period of time of access is provided in the form of counts, in this example.

The e-commerce server 303 may further communicate with the ESG & Encryption server 304 to obtain decryption information (e.g., decryption keys) corresponding to the program or service. The decryption information may be transmitted to the terminal 301 with the rights/counts 307. The terminal 301 may receive the content stream and keystream information as well as optional Electronic Service Guide (ESG) information 308 from the ESG & Encryption server 304. The key stream information may contain KSMs corresponding to the program or service. Each KSM during the period of right of access to the program or service may be decrypted at the terminal 301 such that the program or service may be viewed at the terminal 301. The length of time of access to the program or service at the terminal 301 may be based on the number of KSM decryption counts granted to the terminal 301.

Figure 6:
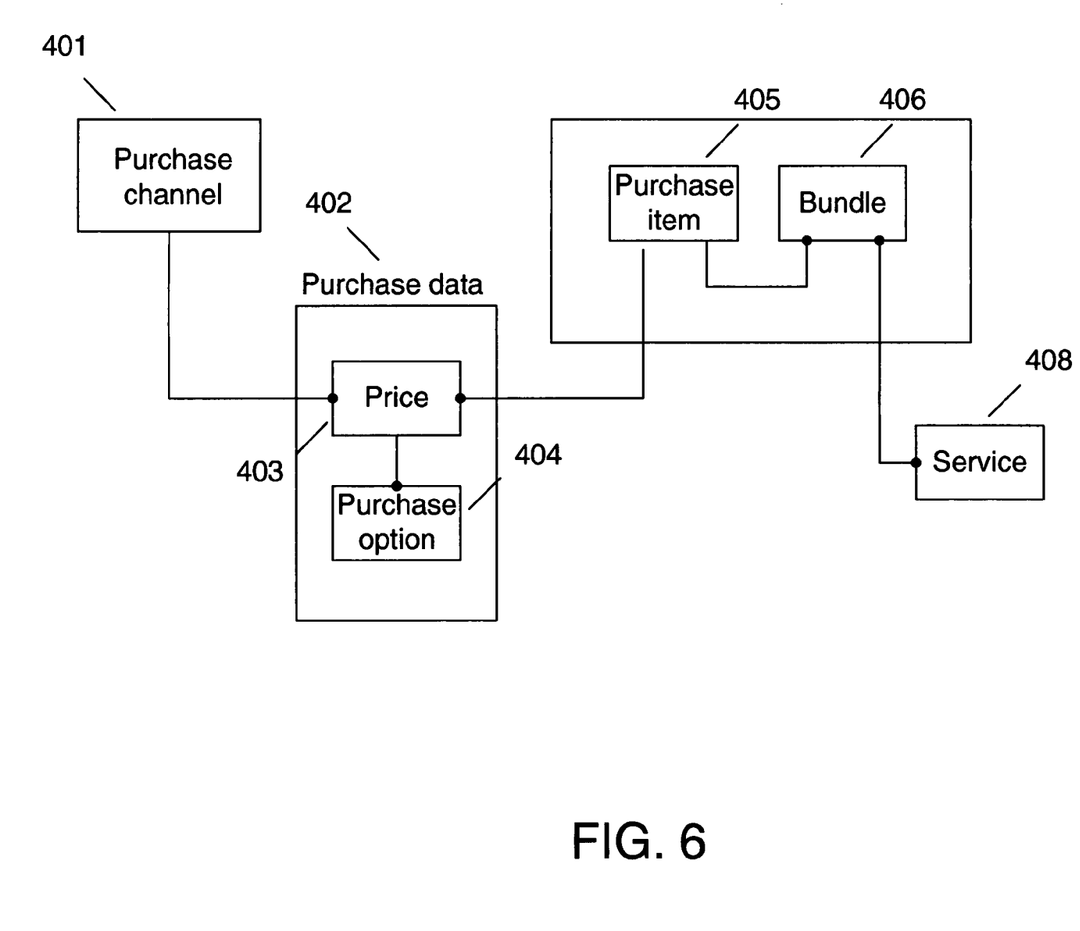
FIG. 6 illustrates an example of purchase or access data mapping in an Electronic Service Guide (ESG) in accordance with an aspect of the present invention.

FIG. 6 illustrates an example of purchase or access data mapping in an Electronic Service Guide (ESG). In this example, a service 408, such as TV programs provided on a TV channel may be grouped into a package. The package may be purchased by a user. In this example, information corresponding to the TV channel or service 408 is included in a purchase item 405. The services or programs are bundled 406 or grouped together into a channel package (i.e., a purchase item 405). The purchase item 405 can be purchased from a user via a purchase channel 401. Each purchase item 405 (e.g., channel package) may be associated with purchase data 402. The purchase data 402 may include any number of parameters. For example, the purchase data 402 may include a price 403. The price 403 may be indicated as a unit per period of time (e.g., dollars per hour) or may be a lump sum. Also, in one aspect of one example, the pricing may be based on viewing time such that a fee is associated with a particular period of time. The particular period of time may be requested by a user or may be preset or predetermined by a service provider, for example.

The purchase data 402 may further include a purchase option 404. In one example, the purchase option 404 may include a parameter for providing a number of KSM decryption counts which access may be granted, a price per unit, a unit (e.g., time), a currency (e.g., dollars, euros, etc.), or a subscription type (e.g., "pay per minute"), etc. A user may thus purchase a program or service package (e.g., purchase item 405) in which the price 403 and other options 404 may be specified.

Figure 8:
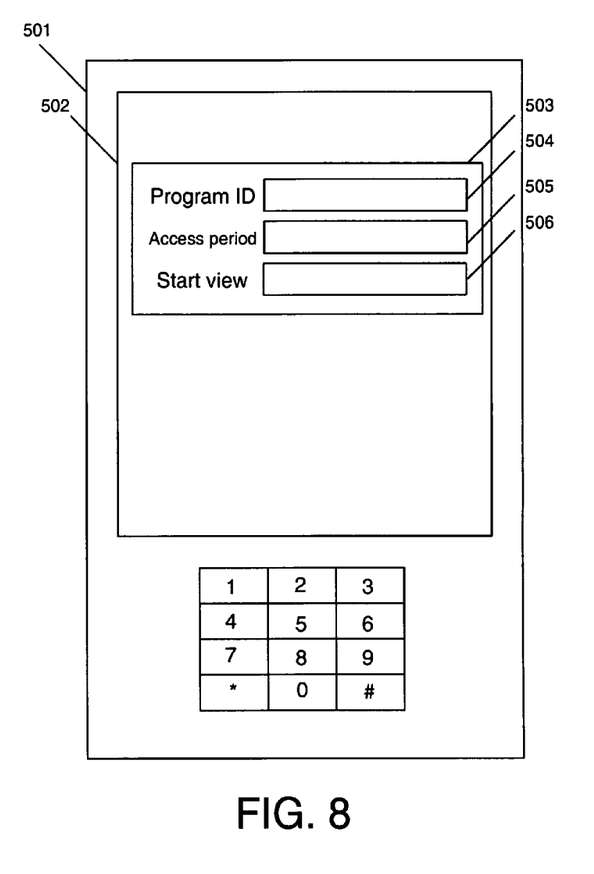
FIG. 8 illustrates an example of a user interface for providing a purchase request in accordance with an aspect of the present invention.

In one example, a user may transmit a purchase request 306 to request a particular period of a program or service as described. FIG. 8 illustrates an example of a mobile terminal and a user interface in which a user may provide the purchase request 306. In this example, a mobile terminal 501 includes a display 502 which may display a user interface 503 for providing a purchase request 306. In this example, a user may desire access to a program or service, such as a television program, via a broadcast network. The mobile terminal 501 may display a user interface 503 on a display 502 as illustrated in FIG. 8. There are many ways in which the user interface 503 may be displayed on the display 502. For example, a user may request the user interface 503 by pressing a button on the mobile terminal 501 or by selecting a displayed user button on the display 502 (not shown).

Also, the user interface on the mobile terminal 501 illustrated in the example of FIG. 8 may display a list of criteria corresponding to programs or services. For example, a user may wish to gain access to a program or service according to various desired criteria. If the user wishes to browse different programs or services to find those programs or services that satisfy a certain criteria or set of criteria that the user desires, the user may invoke a display on the mobile terminal 501 to provide a list of criteria from which to select. For example, a pull-down menu or a pop-up screen or a tooltip may be displayed for providing a list of criterion from which the user may select desired criteria to identify or locate a desired program or service. Such criteria may include but are not limited to a program/service type, genre, producer, director, performer, title, keywords, etc.

The user interface may further include a list of available times or periods of time from which to select. For example, if a user desires access to a program that starts at a particular time or that runs for a particular period of time, the user interface may display a list of start times, stop times, time periods, etc. from which the user may select the desired times. Based on the selection, the program or services satisfying the specified criteria may be provided to the user terminal 501. The list of times (e.g., start time, stop times, time periods, etc.) may be provided on the display 502 or in the user interface 503 in a variety of ways. For example, the list of times may be provided in a pull-down menu, pop up window, tooltip, etc.

Figure 7:
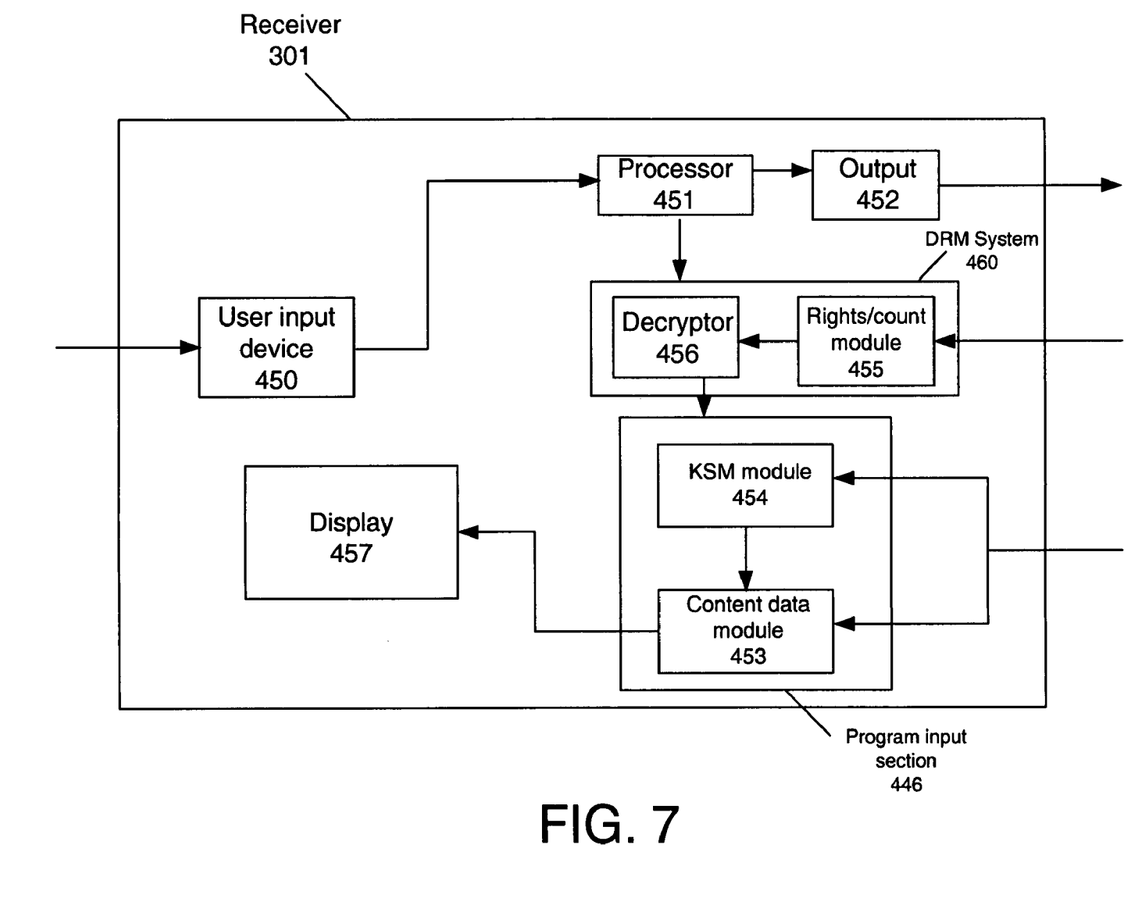
FIG. 7 illustrates an example of a terminal or receiver for accessing an encrypted program or service in accordance with an aspect of the present invention.

FIG. 7 illustrates an example of a terminal or receiver for accessing an encrypted program or service. A receiver 301 may contain a user input device 450 for receiving user input. The user input device 450 may be any device for receiving input such as a keypad, touch screen, etc. The user input device 450 may receive a purchase request for accessing a desired program or service or portion of a program or service. The purchase request may be further processed in a processor 451 and output via an output device 452 to a broadcast network. The receiver 301 may further contain a DRM system 460 which may contain a rights/count module 455 for receiving a rights/count message from the network. The rights/ count message may indicate to the receiver the period of access granted to a program or service which may further be based on information transmitted to the network from the receiver 301 in the purchase request. For example, if the purchase request included a request for a 30 minute period of access to a requested program, then the rights/count message from the network received at the rights/count module 455 of the DRM system 460 may indicate the 30 minute period of access. Also, the rights/count message may indicate the period of access in terms of either time or KSM decryption counts. When the rights/count signal indicates the period of access in terms of KSM decryption counts, the number of counts indicated may correspond to a period of time and a key interval (i.e., the period of time between received key stream messages corresponding to a program or service).

The DRM system 460 may further contain a decryptor 456 which may receive a control signal from the rights/count module 455. The rights/count module 455 may further provide a controlling signal to a decryptor 456. Alternatively, the controlling signal may be provided to a processor which may control the decryptor 456 of the DRM system 460 to decrypt an incoming KSM corresponding program or service based on the controlling signal. The receiver 301 may further receive a content data stream containing the program or service content. The program or service content may be encrypted such that unauthorized users have no access to the program or service. However, in the present example, a user may have requested access to the program or service or a portion of the program or service via the purchase request. Thus, based on the purchase request, at least a portion of the program or service may be decrypted and provided at the receiver 301.

In addition to the program content data stream, a key stream may also be received containing key stream messages at a predetermined or preselected frequency (i.e., KSM separated in time by a key interval). The key stream may be received at a program input section 446. The program input section 446 may include, for example, a KSM module 454 and/or a content data module 453. In another example, the KSM module 454 and/or the content data module 453 may be separate. Based on the purchase request from the receiver 301 and the received rights/count message at the DRM system 460 or the rights/count module 455, the decryptor 456 may decrypt the KSMs within the granted period of access of the program or service. For example, the KSMs received in the key stream at the KSM module 454 may be decrypted by the decryptor 456. The decrypted keys in the KSM may also decrypt the content of the program or data received at the content data module 453. The decrypted program or service content may then be displayed on the display device 457. In one example, the KSMs corresponding to a program or service in a granted period of access may be received at the KSM module 454 and decrypted by the decryptor 456. The decrypted KSMs may be sent to the content data module 453 within the program input section 446 (in this example) to decrypt the program or service associated with the decrypted KSM. Hence, in this example, a program data stream and corresponding key stream are received at the program input section 446 of the receiver 301. The KSMs in the key stream are decrypted in the granted period of access and the decrypted KSMs decrypt the corresponding program or service within the granted period of access. The decrypted program or service may be displayed on the display 457.

In addition, the purchase request may be input at the receiver 301 by the user via a user interface. The user interface 503 as illustrated in FIG. 8 may include various fields for providing a purchase request 306. As the example in FIG. 8 illustrates, a Program ID field 504 may be provided through which a user may indicate a desired program. A user may input an identification code for the program, a title for the program, or any identifying information corresponding to the desired program or service. Also, the user interface 503 may further include Access Period field 505 for providing the desired period of access. For example, a user may input a period of time in the access period field 505 such that a program or service may be provided on the mobile terminal 501 during the indicated period of time. Alternatively, the user may input a number of counts corresponding to the period of time that access to the program or service is desired.

The user interface 502 may also optionally include a start view field in which a user may indicate the beginning time that access to a program or service is desired. For example, if a user wishes to view 10 minutes of a 1-hour program, the user may input a program identifier (such as a code or a title) into the program ID field 504 and indicate in the access period field 505 that 10 minutes of access is desired. If the 10 minutes of access is a portion of the program that begins 15 minutes into the program, for example, the user may input an indication in the start view field 506 that access is desired starting 15 minutes into the program and extending until 25 minutes into the program (i.e., 10 minutes of access). The user may be billed accordingly.

In another example, a menu list may be provided on the user interface 503 including a list of programs or services from which a user may choose. In this example, a user may input a command into the mobile terminal 501 to cause a menu list of programs or services associated with the program ID 504. The user may select a desired program or service from the menu list of programs or services offered. Similarly, a menu list may be displayed corresponding to the access period 505. In this example, a user may cause a menu list of access periods or periods of time to be displayed in association with the access period field 505. The user may select a desired period of time from the menu list of access periods. Also, a similar menu list may be provided for the start view field 506.

In another example, a display device is described having rendered thereon a query specification comprising a first field name in association with a first input field, the first input field for receiving a first user input comprising an identifier corresponding to a requested program or service and a second field name in association with a second input field, the second input field for receiving a requested period of time for access to the requested program or service, the requested period corresponding to a number of decryption counts. In another example, a third field name is provided for receiving a request for start time to begin access to a decrypted program or service.

The embodiments herein include any feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques.

I claim:

1. A method comprising:
   transmitting, from a receiving device, a purchase request including a requested period of access to an encrypted program or service;
   receiving a key stream containing a plurality of key stream messages (KSM) wherein the plurality of KSM is received at intervals corresponding to a key interval of time;

determining, at the receiving device, a number of KSM decryption counts corresponding to the requested period of access and generated based on the key interval of time;

decrypting a KSM received in the key stream;

modifying, at the receiving device, the number of KSM decryption counts upon decrypting the KSM;

determining, at the receiving device, whether the modified number of KSM decryption counts has reached a specified threshold; and in response to determining that the modified number of KSM decryption counts has reached the specified threshold, ending access to the program or service by the receiving device.

2. The method of claim 1 further comprising receiving a content data stream containing the program or service and corresponding to the key stream.

3. The method of claim 2 further comprising decrypting the content data stream during the granted period of access based on each decrypted KSM in the corresponding key stream.

4. The method of claim 3 further comprising discontinuing decrypting after the granted period of access ends.

5. The method of claim 1 further comprising receiving a number of KSM decryption counts corresponding to the requested period of access to the program or service from a remote server.

6. The method of claim 5 wherein the granted period of access is equal to a product of the number of KSM decryption counts and the key interval.

7. The method of claim 5 further comprising determining the granted period of access by multiplying the number of KSM decryption counts by the key interval.

8. The method of claim 1 wherein the purchase request further includes a start view request indicating a requested time of a start of access to the program or service.

9. The method of claim 8 wherein the granted period of access begins at the requested start time.

10. A method comprising:
receiving a purchase request including a requested period of access to an encrypted program or service from a terminal;

converting the period of access to a corresponding number of key stream message (KSM) decryption counts;

transmitting the number of KSM decryption counts to the requesting terminal;

transmitting the encrypted program or service and a corresponding key stream including a plurality of KSM separated by a key interval of time, wherein the plurality of KSM is transmitted at intervals corresponding to the key interval, wherein the number of KSM decryption counts is based on the key interval and wherein the number of KSM decryption counts is configured to control access to the program or service for the requested period of access.

11. The method of claim 10 wherein converting the period of access to the corresponding number of KSM decryption counts comprises dividing the requested period of access by the key interval.

12. The method of claim 10 further comprising transmitting the number of KSM decryption counts in a Rights Object (RO).

13. An apparatus comprising:
a processor; and
memory storing computer readable instructions that, when executed, cause the apparatus to:
transmit a purchase request including a requested period of access to an encrypted program or service;

receive a key stream containing a plurality of key stream messages (KSM) wherein the plurality of KSM is received at intervals corresponding to a key interval of time;

determine a number of KSM decryption counts corresponding to the requested period of access and generated based on the key interval of time;

decrypt a KSM received in the key stream;

modify the number of KSM decryption counts upon decrypting the KSM;

determine whether the modified number of KSM decryption counts has reached a specified threshold; and in response to determining that the modified number of KSM decryption counts has reached the specified threshold, end access to the program or service.

14. The apparatus of claim 13 further comprising a KSM module for providing the decrypted KSM for decrypting the corresponding program or service during the granted period of access.

15. The apparatus of claim 13 wherein ending access to the program or service includes discontinuing decryption such that a KSM received after ending access to the program or service is not decrypted.

16. The apparatus of claim 13 further comprising a count module configured to receive the number of KSM decryption counts corresponding to the granted period of access to the program or service.

17. The apparatus of claim 13 wherein the granted period of access is equal to a product of the number of KSM decryption counts and the key interval.

18. The apparatus of claim 13 wherein the purchase request further includes a start view request indicating a requested time of a start of access to the program or service.

19. The apparatus of claim 18 wherein the granted period of access begins at the requested start time.

20. One or more computer-readable medium comprising computer-readable instructions that, when executed, cause an apparatus to
transmit a purchase request including a requested period of access to an encrypted program or service;

receive a key stream containing a plurality of key stream messages (KSM) wherein the plurality of KSM is received at intervals corresponding to a key interval of time;

determine a number of KSM decryption counts corresponding to the requested period of access and generated based on the key interval of time;

decrypt a KSM received in the key stream;

modify the number of KSM decryption counts upon decrypting the KSM;

determine whether the modified number of KSM decryption counts has reached a specified threshold; and in response to determining that the modified number of KSM decryption counts has reached the specified threshold, end access to the program or service.

21. The one or more computer readable media of claim 20, wherein ending access to the program or service includes discontinuing decryption such that a KSM received after ending access to the program or service is not decrypted.

22. The one or more computer readable media of claim 20, wherein the granted period of access is equal to a product of the number of KSM decryption counts and the key interval.

23. The one or more computer readable media of claim 20, wherein the purchase request further includes a start view request indicating a requested time of a start of access to the program or service.

24. An apparatus comprising:
a processor; and
memory storing computer readable instructions that, when executed, cause the apparatus to:
- receive a purchase request including a requested period of access to an encrypted program or service from a terminal;
- convert the period of access to a corresponding number of key stream message (KSM) decryption counts;
- transmit the number of KSM decryption counts to the requesting terminal;
- transmit the encrypted program or service and a corresponding key stream including a plurality of KSM separated by a key interval of time, wherein the plurality of KSM is transmitted at intervals corresponding to the key interval,
- wherein the number of KSM decryption counts is based on the key interval and wherein the number of KSM decryption counts is configured to control access to the program or service for the requested period of access.

25. The apparatus of claim 24, wherein converting the period of access to the corresponding number of KSM decryption counts comprises dividing the requested period of access by the key interval.

26. The apparatus of claim 24, wherein the computer readable instructions, when executed, further cause the apparatus to transmit the number of KSM decryption counts in a Rights Object (RO).

27. One or more computer-readable medium comprising computer-readable instructions that, when executed, cause an apparatus to
- receive a purchase request including a requested period of access to an encrypted program or service from a terminal;
- convert the period of access to a corresponding number of key stream message (KSM) decryption counts;
- transmit the number of KSM decryption counts to the requesting terminal;
- transmit the encrypted program or service and a corresponding key stream including a plurality of KSM separated by a key interval of time, wherein the plurality of KSM is transmitted at intervals corresponding to the key interval,
- wherein the number of KSM decryption counts is based on the key interval and wherein the number of KSM decryption counts is configured to control access to the program or service for the requested period of access.

28. The one or more computer readable media of claim 27, wherein converting the period of access to the corresponding number of KSM decryption counts comprises dividing the requested period of access by the key interval.

29. The one or more computer readable media of claim 27, wherein the computer readable instructions, when executed, further cause the apparatus to transmit the number of KSM decryption counts in a Rights Object (RO).

* * * * *